Patented Aug. 21, 1934

1,970,607

UNITED STATES PATENT OFFICE 1,970,607

TRIARYLMETHANE DYESTUFF

Lucas P. Kyrides, Buffalo, N. Y., assignor to National Aniline & Chemical Company, Inc., New York, N. Y., a corporation of New York No Drawing. Application December 1, 1928, Serial No. 323,189

18 Claims. (Cl. 260—68)

This invention relates to the production of new dyestuffs of the triarylmethane series and to a new sulfonated intermediate for preparing the same. More specifically, it relates to the production of isopropylbenzylaniline sulfonic acid and to the triarylmethane dyestuffs prepared therefrom, as well as to the triarylmethane dyestuffs prepared from isopropylbenzyl-aniline. The processes whereby the new intermediate and the new dyestuffs are produced are also within the scope of the invention.

The new dyestuffs are characterized by the following probable atomic grouping in the molecule:

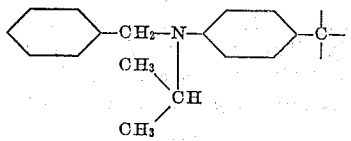

wherein the aryl groups may contain substituents other than hydrogen. In the carbinol form, the new dyestuffs correspond to the probable formula

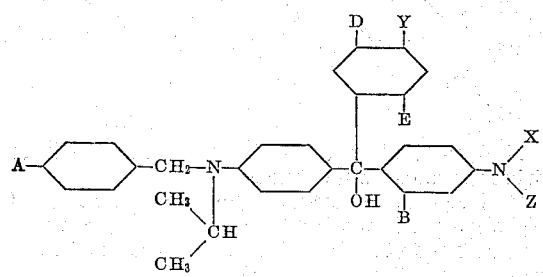

wherein Y represents hydrogen, a sulfo group or a dialkylamino group containing like or unlike normal alkyl groups, A, B and E represent hydrogen atoms or sulfo groups, D represents the hydroxyl or sulfo groups or hydrogen, and X and Z represent like or unlike normal alkyl groups or the isopropyl and benzyl groups respectively, and wherein when Y represents hydrogen, A and B also represent hydrogen, D and E represent sulfo groups and X and Z represent isopropyl and benzyl groups respectively; when Y represents a sulfo group A and B represent hydrogen, E represents a sulfo group, D represents hydrogen or the hydroxyl group and X and Z represent isopropyl and benzyl groups respectively; when D represents the hydroxyl group, A and B represent hydrogen, Y and E represent sulfo groups, and X and Z represent isopropyl and benzyl groups respectively; and when Y represents a dialkylamino group, A and B represent sulfo groups, D and E represent hydrogen and X and Z represent normal alkyl radicals.

The new dyestuffs dye silk and wool from an acid bath in shades ranging from bluish violet to greenish blue. The leuco bases of the new dyestuffs may be conveniently prepared by condensing an isopropylbenzylaniline sulfonic acid with a tetraalkyl-diamino - o - sulfo-benzhydrol having the following probable general formula:

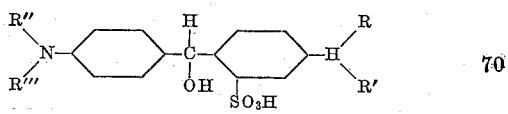

wherein R, R', R'' and R''' represent like or unlike normal alkyl groups; by condensing a disulfobenzaldehyde with isopropylbenzylaniline; or by condensing a m-hydroxybenzaldehyde with isopropylbenzylaniline and sulfonating the leuco base thus produced in a manner similar to that disclosed in U. S. P. 412,613. The resulting leuco bases are then oxidized to the corresponding dyestuff.

The intermediate isopropylbenzylaniline sulfonic acid may conveniently be prepared by sulfonating isopropylbenzylaniline, and is believed to have the following probable formula:

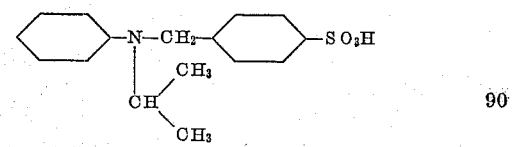

The following examples will serve to illustrate some of the methods by which the new intermediates and new dyestuffs may be prepared. The parts are by weight.

*Example 1.*—Preparation of isopropylbenzylaniline sulfonic acid. 50 parts isopropylbenzylaniline is added to about 43 parts of 100% sulfuric acid at such a rate that the temperature rises to 100 and is maintained at 95°–100° C. About 50 parts of 60% oleum is then slowly added, keeping the temperature at 100°–105° C. When sulfonation is complete the sulfonation mass is poured onto 250 parts ice while keeping the temperature below 70° C. The solution is then cooled to about 45°–50° C. and treated with sodium carbonate until about 75% of the free mineral acid is neutralized. Agitation is then continued until the isopropylbenzylaniline sulfonic acid crystallizes out. It is filtered off, washed free from mineral acid and dried. It has the following probable formula:

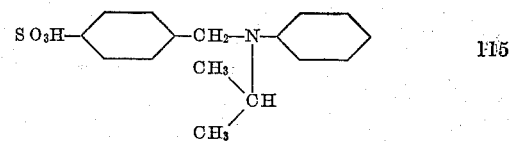

*Example 2.*—10.8 parts (.03 mols) of the hydrol of tetramethyldiamino-o-sulfo-diphenylmethane, having the following probable formula

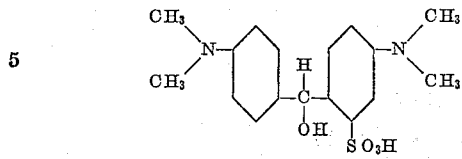

is dissolved in 110 parts of 25% acetic acid, and 9 parts of isopropylbenzylaniline sulfonic acid is added thereto. The reaction mass is heated at 60° for about three hours or until the condensation is complete, after which it is cooled to 25° C. 8.6 parts of lead peroxide ($PbO_2$) is now added thereto at about 25° C. to oxidize the leuco dyestuff to the carbinol form. The lead is now precipitated out of solution by the addition of sodium sulfate, the precipitate filtered off and dyestuff salted out from the filtrate with common salt. The carbinol has the following probable formula:

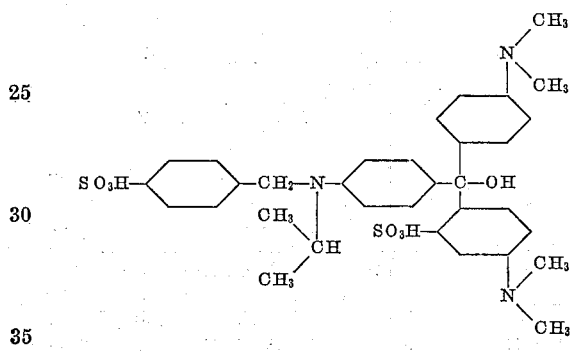

It dyes silk and wool from an acid bath in bluish violet shades.

The hydrol of tetramethyldiamino-o-sulfo-diphenylmethane may be replaced by the corresponding proportion of the hydrol of a tetraalkyldiamino-o-sulfo-diphenylmethane wherein the alkyl groups may be like or unlike, for example, tetraethyldiamino-o-sulfo-diphenylcarbinol, diethyldimethyldiamino-o-sulfo-diphenylcarbinol, or by a tetraalkyldiamino-o-sulfo-diphenylcarbinol having the following general formula

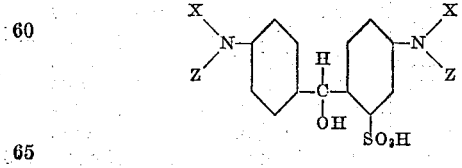

wherein when X and Z represent unlike normal alkyl groups, of which di(ethylmethylamino)-o-sulfo-diphenylcarbinol is an example, to produce the corresponding dyestuff.

*Example 3:*—63 parts (.28 mols) of isopropylbenzylaniline is added to 500 parts of a solution containing .1 mol of 2.5-disulfo-benzaldehyde. The mixture is heated under reflux for about 24 hours or until the condensation is complete. The reaction mass is then permitted to cool. The aqueous layer is drawn off by filtering or decanting and the leuco base remaining is dissolved in water with the aid of caustic soda until the solution is just alkaline to phenolphthalein which solution is then made up to about 500 parts. From this solution, the excess of the amine is extracted with toluene, and the remaining solution containing the leuco base is steam distilled to drive off any occluded toluene. The leuco base solution remaining is then made up with water to about 1000 parts for oxidation.

The solution of the leuco base is cooled to 20° C. and 21.5 parts lead peroxide is added with agitation. 25 parts of glacial acetic acid is now dumped in with agitation. Oxidation of the leuco to the carbinol takes place immediately, but agitation is continued for about half an hour longer. 30 parts sodium sulfate is now added to precipitate the lead as the sulfate, which is filtered off. The color is then salted out with sodium chloride. In the form of its carbinol it has the following probable formula:

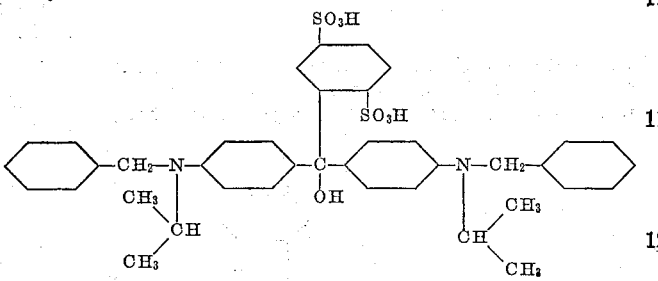

It dyes wool and silk from an acid bath in bright greenish blue shades.

The 2.5-disulfobenzaldehyde may be replaced by 2.4-disulfobenzaldehyde or by m-hydroxybenzaldehyde in which latter case the product is sulfonated after condensation.

By the term normal alkyl group as used in the specification and claims, it is intended to include also the methyl group.

It is obvious that various changes may be made in the examples given without departing from the spirit or scope of the invention as defined in the following claims.

I claim:

1. As a new composition of matter, the triarylmethane dyestuff having in its carbinol form the following general formula

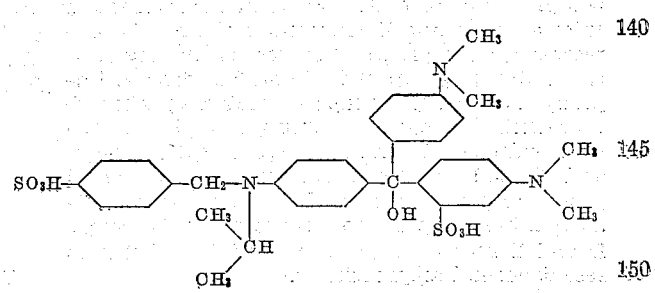

which dyes silk and wool from an acid bath in bluish violet shades, and which is capable of being prepared by condensing isopropylbenzylaniline-p-sulfonic acid with tetramethyldiamino-o-sulfo-benzhydrol and oxidizing the leuco base thus produced to the carbinol.

2. In the process of preparing a triarylmethane dyestuff, the steps which comprise condensing isopropylbenzylaniline sulfonic acid with tetramethyldiamino-o-sulfo-benzhydrol, and oxidizing the leuco base to the carbinol.

3. In the process of preparing a triarylmethane dyestuff, the steps which comprise sulfonating isopropylbenzylaniline to produce isopropylbenzylaniline sulfonic acid, condensing the latter with tetramethyldiamino-o-sulfo-benzhydrol to produce a leuco base, and oxidizing the leuco base to the carbinol.

4. As a new composition of matter, a triarylmethane dyestuff which, in the carbinol form, has the following general formula

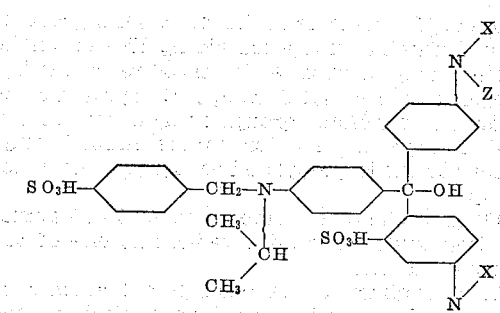

and which is capable of being prepared by condensing isopropylbenzylaniline-p-sulfonic acid with a tetraalkyldiamino-o-sulfo-benzhydrol having the following general formula

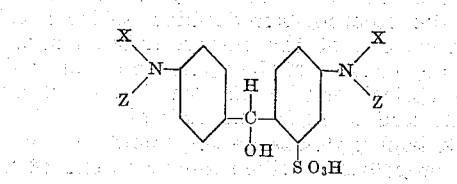

wherein X and Z represent like or unlike normal alkyl groups, and oxidizing the leuco base thus produced to the carbinol.

5. In the process of preparing a triarylmethane dyestuff, the steps which comprise condensing isopropylbenzylaniline sulfonic acid with a tetraalkyldiamino-o-sulfo-benzhydrol of the general formula

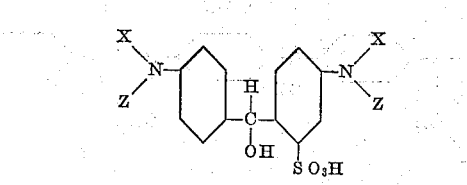

wherein X and Z represent like or unlike normal alkyl groups, and oxidizing the leuco base thus produced to the carbinol.

6. As a new composition of matter, a triarylmethane dyestuff which, in the carbinol form, has the following general formula

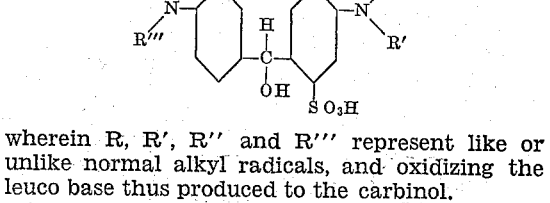

and which is capable of being produced by condensing isopropylbenzylaniline-p-sulfonic acid with a tetraalkyldiamino-o-sulfo-benzhydrol of the following general formula:

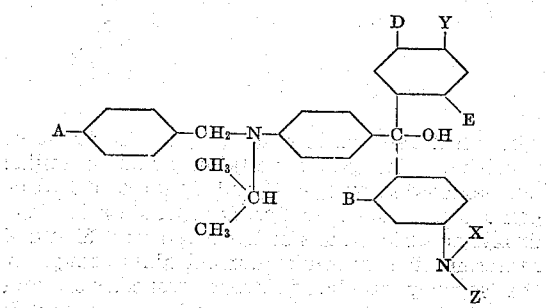

wherein R, R', R'' and R''' represent like or unlike normal alkyl radicals, and oxidizing the leuco base thus produced to the carbinol.

7. As a new composition of matter, a triarylmethane dyestuff having in the form of the carbinol the following general formula:

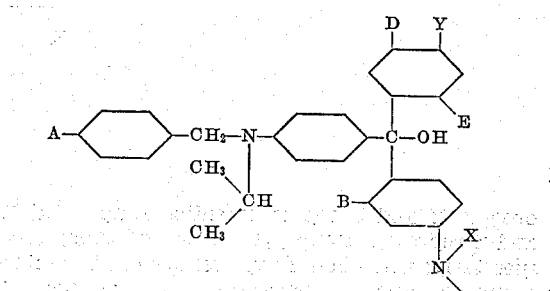

wherein Y represents hydrogen or a dialkylamino group containing like or unlike normal alkyl groups, A, B, D and E represent hydrogen or sulfo groups, and X and Z represent like or unlike normal alkyl groups or the isopropyl and benzyl radicals respectively; and wherein when Y represents hydrogen, A and B also represent hydrogen, D and E represent sulfo groups and X and Z represent the isopropyl and benzyl groups respectively; and when Y represents a dialkylamino group, A and B represent sulfo groups, D and E represent hydrogen, and X and Z represent like or unlike normal alkyl groups.

8. As a new composition of matter, a triarylmethane dyestuff having in the form of the carbinol the following general formula:

wherein Y represents hydrogen, a sulfo group or a dialkylamino group containing like or unlike normal alkyl radicals, A, B and E represent hydrogen atoms or sulfo groups, D represents hydrogen, or hydroxyl or sulfo groups, and X and Z represent like or unlike normal alkyl radicals or the isopropyl and benzyl groups respectively; and wherein when Y represents hydrogen, A and B represent hydrogen, D and E represent sulfo groups, and X and Z represent the isopropyl and benzyl groups respectively; and when Y represents the sulfo group, A and B represent hydrogen, D represents the hydroxyl group, E represents the sulfo group, and X and Z represent the isopropyl and benzyl groups respectively; and when Y represents the dialkylamino group, A and B represent sulfo groups, D and E represent hydrogen, and X and Z represent like or unlike normal alkyl groups.

9. As a new composition of matter, a triarylmethane dyestuff which in the carbinol form has the following general formula:

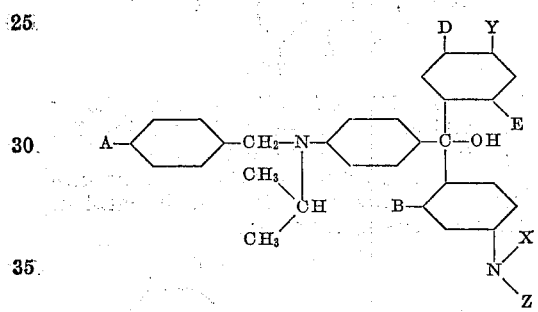

wherein Y represents hydrogen, a sulfo group or a dialkylamino group containing like or unlike normal alkyl groups, A, B and E represent hydrogen atoms or sulfo groups, D represents the hydroxyl or sulfo groups or hydrogen, and X and Z represent like or unlike normal alkyl groups or the isopropyl and benzyl groups respectively; and wherein when Y represents hydrogen, A and B represent hydrogen, D and E represent sulfo groups and X and Z represent isopropyl and benzyl groups respectively; and when Y represents a sulfo group, A and B represent hydrogen, E represents a sulfo group, D represents hydrogen, and X and Z represent isopropyl and benzyl groups respectively; and when D represents the hydroxyl group, A and B represent hydrogen, Y and E represent sulfo groups, and X and Z represent isopropyl and benzyl groups respectively; and when Y represents a dialkylamino group, A and B represent sulfo groups, D and E represent hydrogen and X and Z represent normal alkyl radicals.

10. As a new composition of matter, a triarylmethane dyestuff which in the carbinol form has the following general formula:

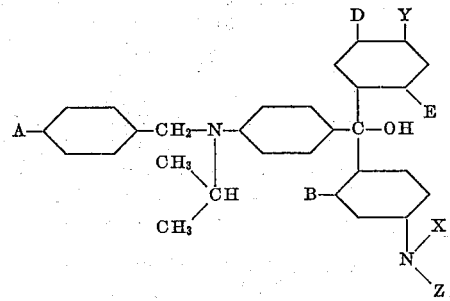

wherein Y represents hydrogen, a sulfo group or a dialkylamino group containing like or unlike normal alkyl groups, A, B and E represent hydrogen atoms or sulfo groups, D represents the hydroxyl or sulfonic groups or hydrogen, and X and Z represent like or unlike normal alkyl groups or the isopropyl and benzyl groups respectively.

11. A triphenylmethane compound containing an isopropylbenzylaniline radical as one of the phenyl radicals.

12. A triphenylmethane compound which contains an isopropylbenzylaniline radical as one of the phenyl radicals and in which one or more of the hydrogen atoms of the phenyl radicals may be substituted by a hydroxyl, sulfonic and dialkylamino radical.

13. A triphenylmethane compound containing a sulfonated isopropylbenzylaniline radical as one of the phenyl radicals.

14. A triphenylmethane compound which contains the isopropylbenzylaniline sulfonic acid radical as one of the phenyl radicals and in which one or more of the hydrogen atoms of the phenyl radicals may be substituted by a hydroxyl, sulfonic and dialkylamino radical.

15. A triphenylmethane compound containing the isopropylbenzylaniline radical as one of the phenyl radicals.

16. As a new composition of matter, a triarylmethane dyestuff having in the form of the carbinol the following general formula:

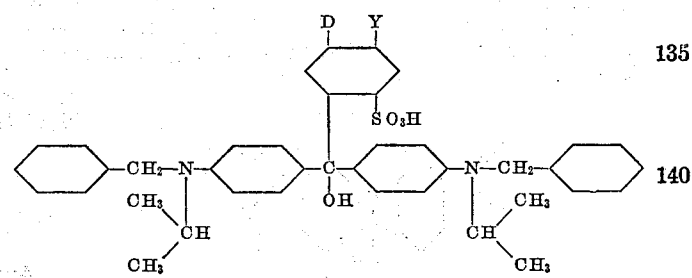

wherein D represents hydrogen or the hydroxyl or sulfo group, and Y represents hydrogen or the sulfo group.

17. As a new composition of matter, a triarylmethane dyestuff having in the form of the carbinol the following general formula:
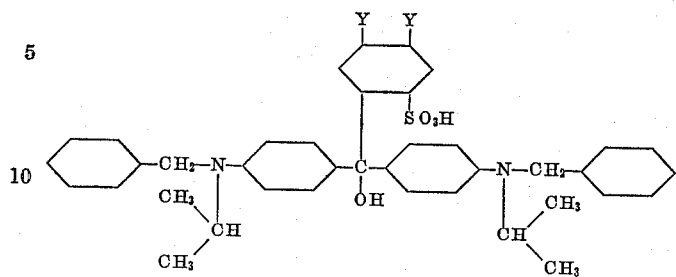
wherein one Y is hydrogen and the other is a sulfo group.
18. As a new composition of matter, a triarylmethane dyestuff having in the form of the carbinol the following general formula:
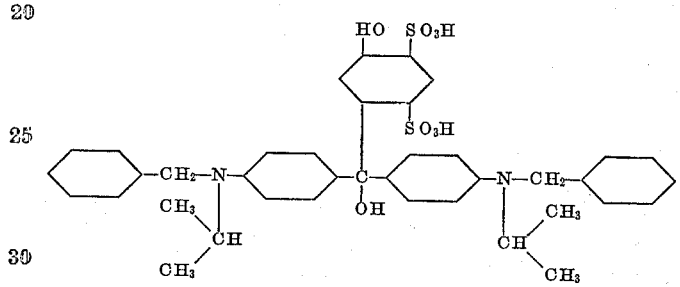
LUCAS P. KYRIDES.